Dec. 23, 1952  J. D. BENNETT  2,622,846
COMBINED TRAVELING BLOCK, ADAPTER, AND HOOK
Filed Jan. 21, 1947 4 Sheets-Sheet 1

INVENTOR.
John D. Bennett
BY *[signature]*
Attorney

Dec. 23, 1952  J. D. BENNETT  2,622,846
COMBINED TRAVELING BLOCK, ADAPTER, AND HOOK
Filed Jan. 21, 1947  4 Sheets-Sheet 2

INVENTOR.
John D. Bennett
BY
Attorney

Dec. 23, 1952 J. D. BENNETT 2,622,846
COMBINED TRAVELING BLOCK, ADAPTER, AND HOOK
Filed Jan. 21, 1947 4 Sheets-Sheet 3

INVENTOR.
John D. Bennett
BY *(signature)*
Attorney

Dec. 23, 1952     J. D. BENNETT     2,622,846
COMBINED TRAVELING BLOCK, ADAPTER, AND HOOK
Filed Jan. 21, 1947     4 Sheets-Sheet 4
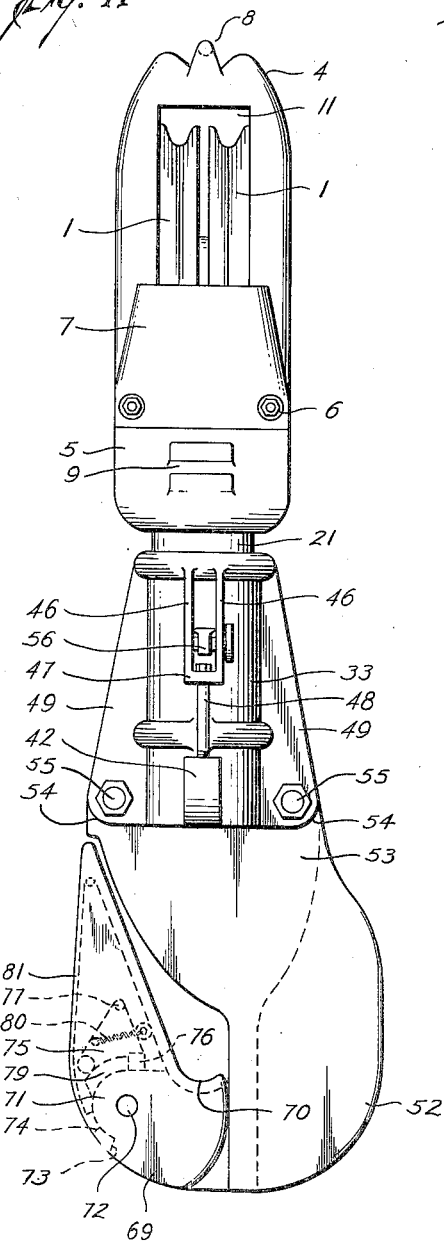
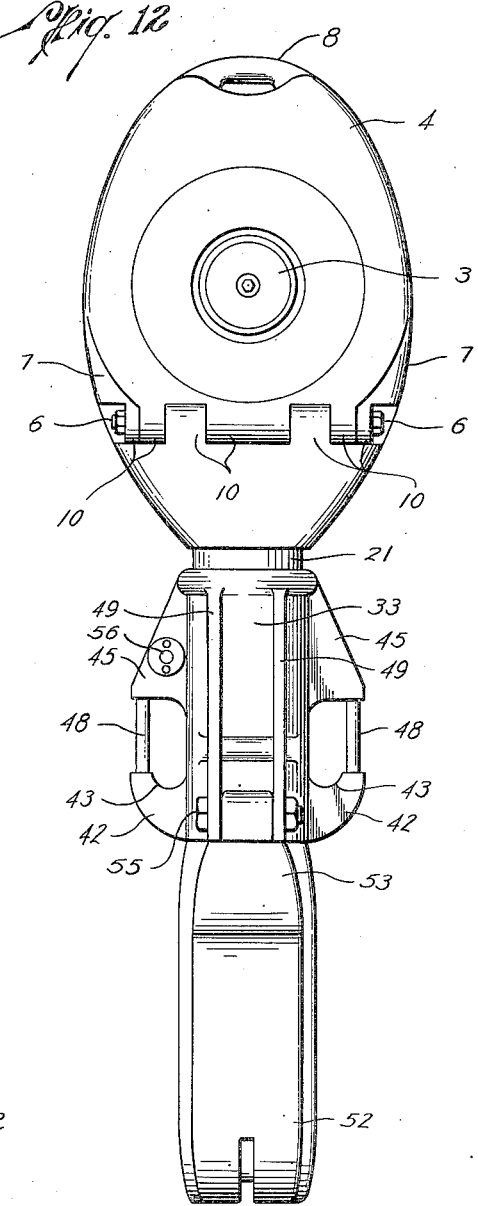
John D. Bennett
INVENTOR.
BY Charles E. Lightfoot
ATTORNEY Patented Dec. 23, 1952

2,622,846

UNITED STATES PATENT OFFICE 2,622,846

COMBINED TRAVELING BLOCK, ADAPTER, AND HOOK

John D. Bennett, Beaumont, Tex., assignor to International Derrick & Equipment Company, Columbus, Ohio, a corporation of Ohio Application January 21, 1947, Serial No. 723,316

9 Claims. (Cl. 254—194)

The invention concerns a combined traveling block, elevator link adapter and swivel hook for use in rotary well drilling operations.

It is an object of the invention to combine a traveling block, a spring loaded elevator link adapter, and a spring loaded swivel hook to form a single unit which is relatively short from end to end and is adapted to occupy a minimum of space in the derrick.

It is a further object of the invention to provide a spring loaded adapter designed to receive a hook member as well as a pair of elevator links, and a hook member suitable for use in connection with such adapter.

It is also an object of the invention to provide a spring loaded adapter designed to receive either a hook member or a clevis, as well as a pair of elevator links, and a hook member having a shank portion adapted to be secured to the adapter by a pair of eyes formed integrally therewith, the hook member being interchangeable with a clevis.

The invention will be understood from the following description and the accompanying drawing, in which:

Figure 11 is a view in elevation similar to that of Figure 1, showing one side of the combined traveling block and adapter with a hook member attached.

Figure 12 is a view in elevation taken at right angles to the view shown in Figure 15.

Figure 1:
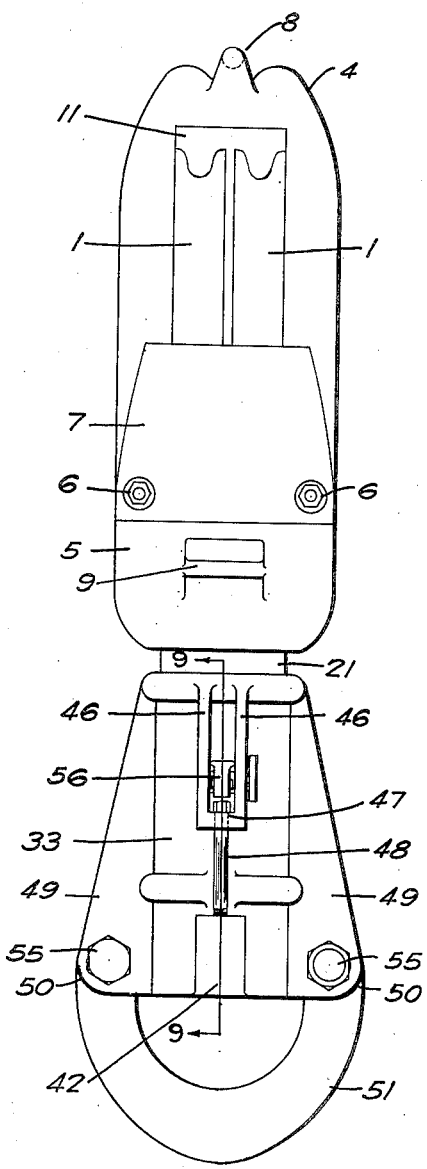
Figure 1 is a view in elevation showing one side of the combined traveling block and adapter with a clevis attached.
Figure 2:
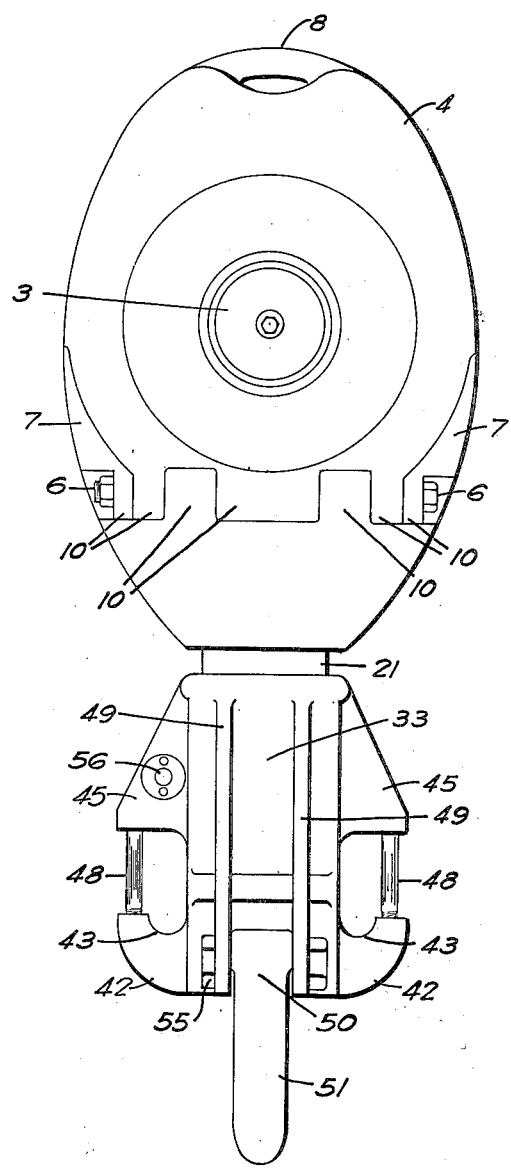
Figure 2 is a view in elevation taken at right angles to the view shown in Figure 1.
Figure 5:
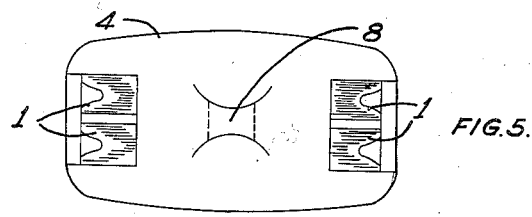
Figure 5 is a plan view showing the top of the traveling block.

Referring to the drawing, a pair of sheaves 1 are provided. The sheaves 1 have roller bearings 2 and are journaled on a trunnion 3. A housing 4 substantially encloses the sheaves 1 and provides end supports for the trunnion 3. The housing 4 is open at the bottom and is provided with a bottom closure member 5 adapted to be pivotally and removably secured to the housing 4 by bolts 6. A pair of removable end plates 7, adapted to be secured in place by the bolts 6, are provided for the housing. A ring 8 is formed in a recessed portion of the top wall of the housing 4 for use in suspending the traveling block from a wire rope. Pins 9, which are positioned in depressions formed in the ends of the closure member 5, are provided for use as handles.

The walls of the housing 4, the closure member 5 and the end plates 7 are formed with interlocking edges 10 which have aligned openings therein and are fastened together by the bolts 6. The arrangement is such that upon removing one of the bolts 6 the closure member 5 may be swung downwardly, the remaining bolt 6 acting as a hinge.

Figure 4:
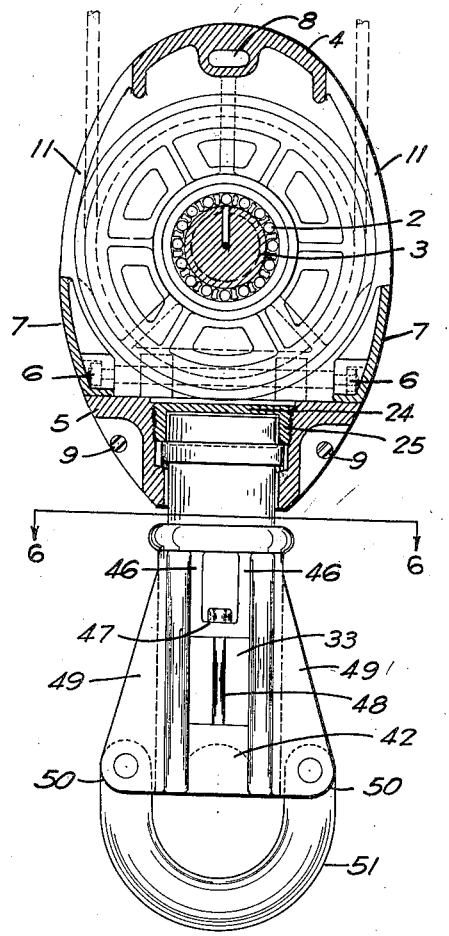
Figure 4 is a view in elevation taken at right angles to the view shown in Figure 3 showing the combined traveling block and adapter with a clevis attached, the upper portion only of Figure 4 being a sectional view taken on a median line.
Figure 6:
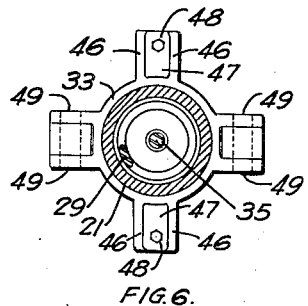
Figure 6 is a sectional plan view taken on the line 6—6 of Figure 4.
Figure 3:
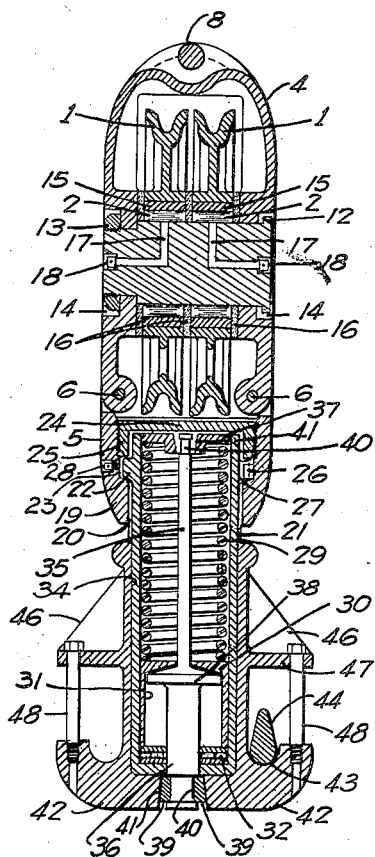
Figure 3 is a sectional view in elevation taken on a median line showing the combined traveling block and adapter with the hook removed, the adapter member only being rotated at right angles to the position shown in Figure 1.
Figure 10:
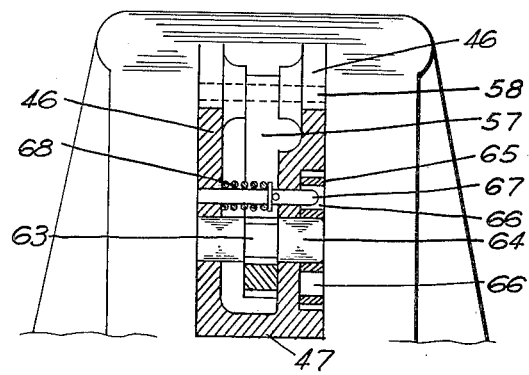
Figure 10 is an enlarged fragmentary view taken on the line 10—10 of Figure 9.
Figure 9:
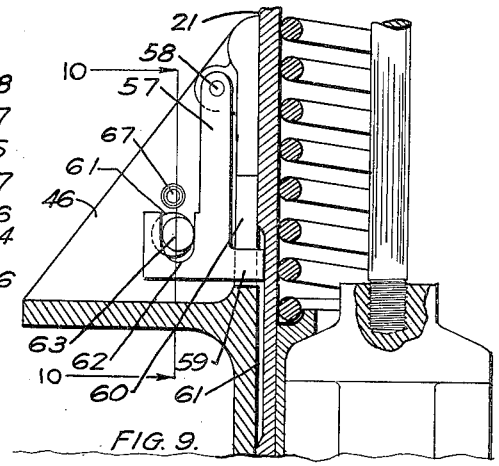
Figure 9 is an enlarged fragmentary view taken on the line 9—9 of Figure 1.
Figure 7:
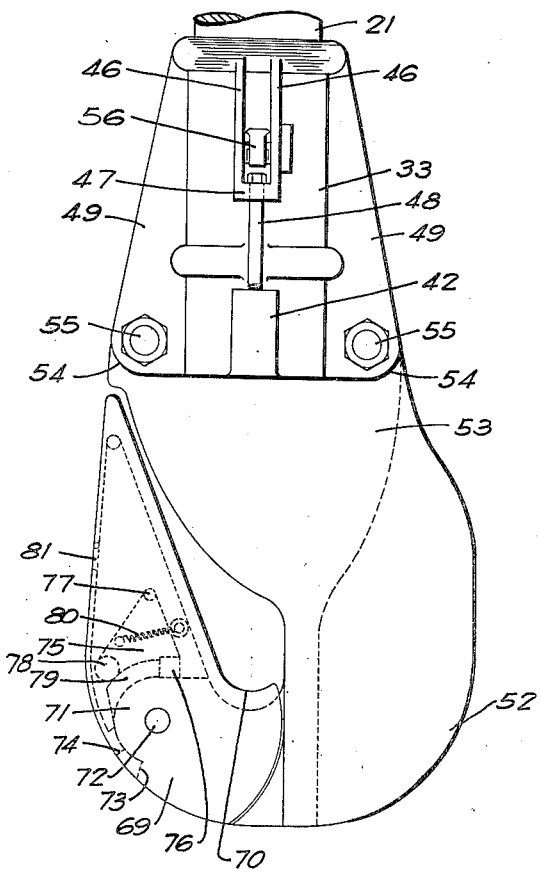
Figure 7 is a fragmentary view in elevation showing the lower portion of the adapter as illustrated in Figure 1, with the clevis removed and the hook member secured in its place.
Figure 8:
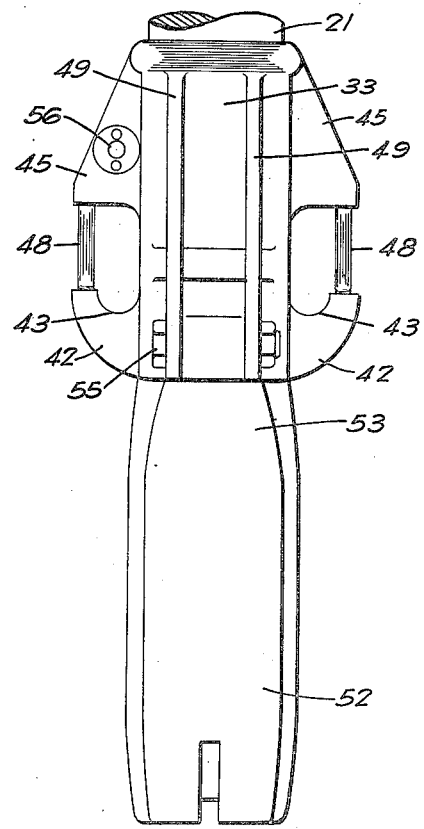
Figure 8 is a fragmentary view in elevation taken at right angles to the view shown in Figure 7.

Openings 11 are provided in the end walls of the housing 4, above the tops of the end plates 7, to receive a wire rope, indicated by the dotted lines in Figure 4.

The trunnion 3 has a shoulder 12 at one end adapted to engage a side wall of the housing 4, and is threaded at the other end to receive a trunnion retaining member 13 which engages the opposite wall of the housing 4. The side walls of the housing 4 are provided with openings 14 adapted to receive the trunnion 3, and are depressed inwardly about the openings 14 so that the ends of the trunnion 3 are flush with the exterior surfaces of the housing 4.

The roller bearings 2 engage the trunnion 3 directly, race rings 15 being provided only between the bearings 2 and the sheaves 1. Spacing rings 16 are provided between the sheaves 1 and between the sheaves 1 and the side walls of the housing 4. Lubricating channels 17 and fittings 18 are provided in the trunnion 3 for lubricating the bearings 2 from the ends of the trunnion 3. The ends of the trunnion 3 are depressed to receive the lubricating fittings 18 so that said fitting do not protrude.

The closure member 5 is formed with a downwardly tapering tubular portion 19 having a central bearing 20 in the bottom thereof. A cylindrical spring housing 21 having an external, annular shoulder 22 near the top thereof is partially enclosed by the tubular portion 19, the lower end of the spring housing 21 extending downwardly thru the central bearing. There is an annular inside groove 23 in the portion 19 adapted to receive the shoulder 22 of the spring housing 21 and a cap 24 is screwed onto the upper end of portion 19 above the spring housing 21 and whose lower margin 25 is adapted to engage the shoulder 22. The upper and lower surfaces of the shoulder 22 are respectively concave and convex, and the lower side of groove 23 and the margin of cap 25 are respectively concave and convex, the arrangement being such that the spring housing 21 is capable of a limited pivotal, or swinging movement. A tongue 26 projecting inwardly from the portion 19 and engaging a groove 27 in the shoulder 22 slidably secures the spring housing 21 against rotation with respect to the annular portion 19. A lubricating fitting 18 is provided in the wall of the annular portion 19 for lubricating the joint formed by the upper and lower surfaces of the shoulder 22, and the cap 25. The wall of the portion 19 is depressed to receive the lubricating fitting 18 so that it does not protrude.

A compression spring 29 is positioned in the spring housing 21. A spring seat 30 is adapted to support the spring 29 from the bottom and has a downwardly extending annulus 31 adapted to engage a thrust bearing 32 positioned in the bottom of the spring housing 21.

An adapter member 33 is provided, the adapter member 33 having a cylindrical bore 34 adapted to receive the lower end of the spring housing 21 and being slidable and rotatable with respect thereto. A pin 35 is removably secured at its lower end, as hereinafter described, to the adapter member 33 and extends upwardly thru a central opening 36 in the bottom of the spring housing 21. A spring retaining member 37 is removably secured, as hereinafter described, to the upper end of the pin 35 and is adapted to engage the top of the compression spring 29. The pin 35 has a shoulder 38 above its lower end and below the spring seat 30 adapted to engage the thrust bearing 32 when the spring 29 is fully compressed.

The pin 35 is secured at its ends to the adapter member 33 and the spring retaining member 37, respectively, by pairs of semi-circular wedges 39 which engage annular grooves 40 in the pin 35 and tapered circular openings 41 in the adapter member 33 and the spring retaining member 37.

The adapter member 33 is yieldably and rotatably supported with respect to the spring housing 21. The compression spring 29 is adapted to support the weight of a stand of pipe in the derrick before it is fully compressed. Thus when the joints of pipe are being unscrewed the upper joint will be gradually lifted from the lower joint as the joints are unscrewed.

A pair of lugs 42 positioned on opposite sides of the adapter member 33 have notches 43 therein adapted to receive a pair of elevator links, one of which is indicated at 44. A second pair of lugs 45 are positioned directly above the lugs 42. Each of the lugs 45 consists of a pair of longitudinal ribs 46 joined at their lower ends by a transverse web 47. Screws 48 inserted thru openings in the transverse webs 47 engage the lugs 42 and are adapted to retain the elevator links 44 in the spaces between the lugs 42 and the lugs 45.

Two pairs of longitudinal ribs 49 are positioned on opposite sides of the adapter member 33 and extend laterally from the adapter member 33 at right angles to the lugs 42. Each pair of ribs 49 is adapted to receive between them one of a pair of eyes, such as the eyes 50 of a clevis 51. A hook member 52 is provided, the hook member 52 having a shank portion 53 adapted to be secured to the adapter member 33 by a pair of eyes 54 formed integrally therewith. Bolts 55 are inserted thru openings in the ribs 49 and the eyes 50 of the clevis 51 or the eyes 54 of the hook member 52, as the case may be, the hook member 52 being interchangeable with the clevis 51.

A locking device, indicated generally at 56, is provided for releasably locking the adapter member 33 against rotation with respect to the spring housing 21. The locking device includes a member 57 which is pivotally secured between one of the pairs of ribs 46 by a pin 58. The member 57 is formed with a tongue 59 adapted to be inserted thru a slot 60 in the wall of the adapter member 33 and a groove 61 in the wall of the spring housing 21. On the side opposite the tongue 59 the member 57 is provided with a notch 62 which is adapted to receive a cam portion 63 which is formed integrally between the two ends of a pin 64 which extends thru the ribs 46. The cam portion 63 is off center with respect to the pin 64, and is of smaller diameter. The arrangement is such that the tongue 59 is moved in and out of the slot 60 and the groove 61 by rotating the pin 64. The pin 64 is secured at one end to a wheel 65 and is adapted to be rotated therewith. The wheel 65 is provided with a pair of openings 66 on opposite sides thereof, and is adapted to be releasably secured in either of two positions to maintain the locking device in operative and inoperative positions, respectively, by a depressable pin 67 which is mounted on one of the ribs 46 and is adapted to be forced into engagement with one of the openings 66 by a spring 68. The wheel 65 is adapted to be operatively engaged by inserting a hook thru one of the openings 66 and depressing the pin 67.

As shown by the dotted lines, the back of the hook member 52 is shaped generally like a saddle, being curved inwardly and adapted to engage a pipe, the pipe acting as a guide for aligning the elevators for ease of engagement of the elevators to the pipe.

The forward end of the hook member 52 is provided with a locking arm 69 which is adapted to extend outwardly to receive a swivel bail or the like, and when in closed position is adapted to support the swivel bail in a notch 70 formed in the lower end thereof. The locking arm 69 is shaped generally like a saddle and is adapted to fit over a snout 71 which constitutes the forward end of the hook member 52. The locking arm 69 is pivotally secured intermediate its ends to the snout 71 by a pin 72. A shoulder 73 on the lower side of the snout 71 engages the body of the locking arm 69 at 74 and supports the locking arm 69 in open position. A latching member, which is formed by a pair of triangular pieces 75 connected by a cross bar 76 and a pin 77, is pivotally secured within the locking arm 69 by a pin 78, and the cross bar 76 is adapted to engage a lug 79 formed on the end of the snout 71, which is straddled by the latching member, when the locking arm 69 is in closed position. The cross piece 76 is retained in engagement with the lug 79 by a spring 80, and may be disengaged by inserting a hook thru an opening 81 in the body of the locking arm 69 and contacting the pin 77.

I claim:

1. A combined traveling block, adapter and hook comprising a trunnion, a sheave adapted to be journaled on the trunnion, a housing adapted to substantially enclose the sheave and to provide end supports for the trunnion, a bottom closure member adapted to be pivotally and removably secured to the housing, an adapter member, means for yieldably and rotatably suspending the adapter member from the closure member, a pair of link receiving means positioned on opposite sides of the adapter member, a pair of eye receiving means positioned on opposite sides of the adapter member and extending laterally therefrom at right angles to the link receiving means, and a hook member having a shank portion adapted to be secured to the adapter member by a pair of eyes formed integrally therewith.

2. A combined traveling block, adapter and hook comprising a trunnion, a plurality of sheaves adapted to be journaled on the trunnion, a housing adapted to substantially enclose the sheaves and to provide end supports for the trunnion, a bottom closure member adapted to be pivotally and removably secured to the housing, an adapter member, means for yieldably and rotatably suspending the adapter member from the closure member, a pair of lugs positioned on opposite sides of the adapter member and having notches therein adapted to receive a pair of elevator links, a second pair of lugs positioned directly above the first mentioned lugs, removable fastenings adapted to retain the elevator links in the spaces between the upper and lower lugs, two pairs of longitudinal ribs positioned on opposite sides of the adapter member and extending laterally therefrom at right angles to the lugs, each pair of ribs being adapted to receive between them one of a pair of eyes and having aligned openings therein, a hook member having a shank portion adapted to be secured to the adapter member by a pair of eyes formed integrally therewith, and removable fastenings adapted to engage the openings in the ribs and the eyes of the hook member.

3. A combined traveling block, adapter and hook comprising a trunnion, a plurality of sheaves adapted to be journaled on the trunnion, a housing adapted to substantially enclose the sheaves and to provide end supports for the trunnion, a bottom closure member adapted to be pivotally and removably secured to the housing, a cylindrical spring housing adapted to be pivotally suspended from the closure member, a compression spring receivable in the spring housing, a spring seat adapted to support the spring from the bottom and having a downwardly extending annulus adapted to engage a thrust bearing, a thrust bearing positioned in the bottom of the spring housing, an adapter member having a cylindrical bore adapted to receive the lower end of the spring housing and being slidable and rotatable with respect thereto, a pin secured at its lower end to the adapter member and extending upwardly thru a central opening in the bottom of the spring housing, a spring retaining member secured to the upper end of the pin and adapted to engage the top of the compression spring, the pin having a shoulder above its lower end and below the spring seat adapted to engage the thrust bearing when the spring is fully compressed, a pair of link receiving means positioned on opposite sides of the adapter member, a pair of eye receiving means positioned on opposite sides of the adapter member and extending laterally therefrom at right angles to the link receiving means, and a hook member having a shank portion adapted to be secured to the adapter member by a pair of eyes formed integrally therewith.

4. A combined traveling block, adapter and hook comprising a trunnion, a plurality of sheaves adapted to be journaled on the trunnion, a housing adapted to substantially enclose the sheaves and to provide end supports for the trunnion, a bottom closure member adapted to be pivotally and removably secured to the housing, the closure member being formed with a downwardly depressed annular portion having a central opening in the bottom thereof, a cylindrical spring housing having a shoulder near the top thereof adapted to be partially enclosed by the annular portion, the lower end of the spring housing extending downwardly thru the central opening, a bearing positioned in the bottom of the annular portion and adapted to engage the shoulder, a retaining member adapted to be secured in the annular portion above the spring housing and having a downwardly extending annulus adapted to engage the shoulder, the upper and lower surfaces of the shoulder being respectively concave and convex and the surfaces of the bearing and the annulus being respectively concave and convex, the arrangement being such that the spring housing is capable of a limited pivotal movement, means for slidably securing the spring housing against rotation with respect to the annular portion, a compression spring receivable in the spring housing, a spring seat adapted to support the spring from the bottom and having a downwardly extending annulus adapted to engage a thrust bearing, a thrust bearing positioned in the bottom of the spring housing, an adapter member having a cylindrical bore adapted to receive the lower end of the spring housing and being slidable and rotatable with respect thereto, a pin secured at its lower end to the adapter member and extending upwardly thru a central opening in the bottom of the spring housing, a spring retaining member secured to the upper end of the pin and adapted to engage the top of the compression spring, the pin having a shoulder above its lower end and below the spring seat adapted to engage the thrust bearing when the spring is fully compressed, means for releasably locking the adapter member against rotation with respect to the spring housing, a pair of lugs positioned on opposite sides of the adapter member and having notches therein adapted to receive a pair of elevator links, a second pair of lugs positioned directly above the first mentioned lugs, removable fastenings adapted to retain the elevator links in the spaces between the upper and lower lugs, two pairs of longitudinal ribs positioned on opposite sides of the adapter member and extending laterally therefrom at right angles to the lugs, each pair of ribs being adapted to receive between them one of a pair of eyes and having aligned openings therein, a hook member having a shank portion adapted to be secured to the adapter member by a pair of eyes formed integrally therewith, and removable fastenings adapted to engage the openings in the ribs and the eyes of the hook member.

5. A combined traveling block and adapter comprising a trunnion, a sheave adapted to be journaled on the trunnion, a housing adapted to substantially enclose the sheave and to provide end supports for the trunnion, a bottom closure member adapted to be pivotally and removably secured to the housing, a cylindrical spring housing adapted to be pivotally suspended from the closure member, a compression spring receivable in the spring housing, a spring seat adapted to support the spring from the bottom and having a downwardly extending annulus adapted to engage a thrust bearing, a thrust bearing positioned in the bottom of the spring housing, an adapter member having a cylindrical bore adapted to receive the lower end of the spring housing and being slidable and rotatable with respect thereto, a pin secured at its lower end to the adapter member and extending upwardly thru a central opening in the bottom of the spring housing, a spring retaining member secured to the upper end of the pin and adapted to engage the top of the compression spring, the pin having a shoulder above its lower end and below the spring seat adapted to engage the thrust bearing when the spring is fully compressed, a pair of link receiving means positioned on opposite sides of the adapter member, and a pair of eye receiving means positioned on opposite sides of the adapter member and extending laterally therefrom at right angles to the link receiving means.

6. A combined adapter and hook comprising an adapter member, a pair of link receiving means positioned on opposite sides of the adapter member, a pair of eye receiving means positioned on opposite sides of the adapter member and extending laterally therefrom at right angles to the link receiving means, and a hook member having a shank portion adapted to be secured to the adapter member by a pair of eyes formed integrally therewith.

7. A combined adapter and hook comprising a cylindrical spring housing, a compression spring receivable in the spring housing, a spring seat adapted to support the spring from the bottom and having a downwardly extending annulus adapted to engage a thrust bearing, a thrust bearing positioned in the bottom of the spring housing, an adapter member having a cylindrical bore adapted to receive the lower end of the spring housing and being slidable and rotatable with respect thereto, a pin secured at its lower end to the adapter member and extending upwardly thru a central opening in the bottom of the spring housing, a spring retaining member secured to the upper end of the pin and adapted to engage the top of the compression spring, the pin having a shoulder above its lower end and below the spring seat adapted to engage the thrust bearing when the spring is fully compressed, a pair of link receiving means positioned on opposite sides of the adapter member, a pair of eye receiving means positioned on opposite sides of the adapter member and extending laterally therefrom at right angles to the link receiving means, and a hook member having a shank portion adapted to be secured to the adapter member by a pair of eyes formed integrally therewith.

8. An adapter comprising a cylindrical spring housing, a compression spring receivable in the spring housing, a spring seat adapted to support the spring from the bottom and having a downwardly extending annulus adapted to engage a thrust bearing, a thrust bearing positioned in the bottom of the spring housing, an adapter member having a cylindrical bore adapted to receive the lower end of the spring housing and being slidable and rotatable with respect thereto, a pin secured at its lower end to the adapter member and extending upwardly thru a central opening in the bottom of the spring housing, a spring retaining member secured to the upper end of the pin and adapted to engage the top of the compression spring, the pin having a shoulder above its lower end and below the spring seat adapted to engage the thrust bearing when the spring is fully compressed, a pair of link receiving means positioned on opposite sides of the adapter member, and a pair of eye receiving means positioned on opposite sides of the adapter member and extending laterally therefrom at right angles to the link receiving means.

9. An adapter comprising a cylindrical spring housing, a compression spring receivable in the spring housing, a spring seat adapted to support the spring from the bottom and having a downwardly extending annulus adapted to engage a thrust bearing, a thrust bearing positioned in the bottom of the spring housing, an adapter member having a cylindrical bore adapted to receive the lower end of the spring housing and being slidable and rotatable with respect thereto, a pin secured at its lower end to the adapter member and extending upwardly thru a central opening in the bottom of the spring housing, a spring retaining member secured to the upper end of the pin and adapted to engage the top of the compression spring, the pin having a shoulder above its lower end and below the spring seat adapted to engage the thrust bearing when the spring is fully compressed, a pair of lugs positioned on opposite sides of the adapter member and having notches therein adapted to receive a pair of elevator links, a pair of spaced longitudinally extending ribs on the adapter member above each of said lugs, a transverse web connecting each of said pairs of ribs, each of said webs having an opening therethrough, retainer members extending through said openings and cooperable with the lugs outwardly of said notches to retain the elevator links in the notches, and a pair of eye receiving means positioned on opposite sides of the adapter member and extending laterally therefrom at right angles to the link receiving means.

JOHN D. BENNETT.

REFERENCES CITED

The following references are of record in the file of this patent:

UNITED STATES PATENTS

| Number | Name | Date |
|---|---|---|
| 1,465,120 | Fair | Aug. 14, 1923 |
| 1,713,586 | Wright | May 21, 1929 |
| 1,730,433 | MacDonald | Oct. 8, 1929 |
| 1,733,509 | Minor | Oct. 29, 1929 |
| 1,767,325 | Taylor | June 24, 1930 |
| 1,796,250 | Greve | Mar. 10, 1931 |
| 1,796,981 | Creighton | Mar. 17, 1931 |
| 1,803,721 | Minor | May 5, 1931 |
| 1,825,018 | Smith | Sept. 29, 1931 |
| 1,842,638 | Wigle | Jan. 26, 1932 |
| 1,956,786 | Bemis | May 1, 1934 |
| 2,027,376 | Grau | Jan. 14, 1936 |
| 2,158,232 | Grau et al. | May 16, 1939 |
| 2,158,372 | Long | May 16, 1939 |
| 2,158,373 | Long | May 16, 1939 |
| 2,165,413 | Ratigan | July 11, 1939 |
| 2,203,139 | Grau et al. | June 4, 1940 |
| 2,215,049 | Minor | Sept. 17, 1940 |
| 2,254,828 | Linn | Sept. 2, 1941 |
| 2,314,502 | Kelly | Mar. 23, 1943 |